United States Patent
Fernando et al.

(10) Patent No.: US 9,673,842 B2
(45) Date of Patent: Jun. 6, 2017

(54) COMBINING MULTIPLE DESIRED SIGNALS INTO A SINGLE BASEBAND SIGNAL

(75) Inventors: Udara C. Fernando, San Diego, CA (US); Prasad Srinivasa Siva Gudem, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 13/477,988

(22) Filed: May 22, 2012

(65) Prior Publication Data
US 2013/0287077 A1 Oct. 31, 2013

Related U.S. Application Data

(60) Provisional application No. 61/638,292, filed on Apr. 25, 2012.

(51) Int. Cl.
*H04B 17/02* (2006.01)
*H04B 1/00* (2006.01)
*H04L 5/00* (2006.01)

(52) U.S. Cl.
CPC ........... *H04B 1/005* (2013.01); *H04B 1/0057* (2013.01); *H04L 5/001* (2013.01)

(58) Field of Classification Search
CPC ........... H04L 25/02; H04L 5/001; H04Q 5/02; H04B 1/40; H04B 1/005; H04B 1/0057; H03B 19/00
USPC ............................. 455/137, 127.1, 67.11, 126
See application file for complete search history.

(56) References Cited

U.S. PATENT DOCUMENTS

| | | | | |
|---|---|---|---|---|
| 5,408,695 A | * | 4/1995 | Dorr | ..................... H04L 27/152 375/223 |
| 5,749,051 A | * | 5/1998 | Dent | ....................... H03D 1/22 455/317 |
| 5,794,159 A | | 8/1998 | Portin | |
| 6,480,169 B2 | * | 11/2002 | Fowler | ..................... H01Q 1/46 343/702 |
| 6,728,517 B2 | | 4/2004 | Sugar et al. | |
| 6,963,602 B1 | * | 11/2005 | Borowski | ................. H03J 7/04 375/142 |
| 7,197,091 B1 | * | 3/2007 | Petrov | .................... H03D 3/007 341/118 |

(Continued)

FOREIGN PATENT DOCUMENTS

| | | |
|---|---|---|
| CN | 1230309 A | 9/1999 |
| CN | 1529947 A | 9/2004 |

(Continued)

OTHER PUBLICATIONS

International Search Report and Written Opinion—PCT/US2013/038288—ISA/EPO—Jul. 22, 2013.

(Continued)

*Primary Examiner* — M D Talukder
(74) *Attorney, Agent, or Firm* — Liberty E. Mann

(57) ABSTRACT

A transceiver for receiving multiple desired signals is described. The transceiver includes a first downconverter that receives a first received signal. The transceiver also includes a second downconverter that receives the first received signal. The transceiver further includes a first adder that receives an output of the first downconverter and a second received signal. The transceiver also includes a second adder that receives an output of the second downconverter.

34 Claims, 11 Drawing Sheets

(56) References Cited

U.S. PATENT DOCUMENTS

| | | | |
|---|---|---|---|
| 7,573,398 B2* | 8/2009 | Hoctor | H04B 7/0857 340/870.06 |
| 7,856,048 B1* | 12/2010 | Smaini | H04B 1/40 330/2 |
| 8,229,381 B2* | 7/2012 | Ling | H04B 1/40 455/232.1 |
| 8,938,023 B2* | 1/2015 | Aparin | H04L 27/0002 370/334 |
| 2002/0080728 A1* | 6/2002 | Sugar | H04B 1/0003 370/252 |
| 2002/0173337 A1* | 11/2002 | Hajimiri | H04B 1/005 455/552.1 |
| 2002/0187761 A1* | 12/2002 | Im | H04B 1/0475 455/126 |
| 2004/0002361 A1* | 1/2004 | Kermalli | H04B 1/18 455/561 |
| 2004/0085933 A1* | 5/2004 | Wang | H01Q 3/42 370/334 |
| 2004/0204034 A1* | 10/2004 | Hanrahan | H03D 7/16 455/552.1 |
| 2004/0218576 A1 | 11/2004 | Imagawa et al. | |
| 2005/0094750 A1* | 5/2005 | Park | H04H 20/06 375/343 |
| 2005/0163038 A1 | 7/2005 | Anvari | |
| 2006/0083335 A1* | 4/2006 | Seendripu | H03D 3/008 375/332 |
| 2007/0002961 A1* | 1/2007 | Hoctor | H04B 7/0857 375/267 |
| 2007/0066254 A1 | 3/2007 | Tsuchie et al. | |
| 2007/0105513 A1* | 5/2007 | Son | H04B 1/0064 455/132 |
| 2007/0207744 A1* | 9/2007 | Rofougaran | H04B 1/406 455/73 |
| 2007/0254592 A1* | 11/2007 | McCallister | H03F 1/0205 455/67.11 |
| 2007/0259636 A1* | 11/2007 | Fisher | G01S 3/043 455/207 |
| 2008/0214192 A1* | 9/2008 | Soliman | H04W 36/32 455/436 |
| 2008/0315996 A1* | 12/2008 | Domokos | G06K 7/0008 340/10.1 |
| 2009/0058475 A1* | 3/2009 | Jung | H03D 7/161 327/113 |
| 2009/0190633 A1 | 7/2009 | Smith | |
| 2009/0290659 A1* | 11/2009 | Petrovic | H04H 20/30 375/340 |
| 2010/0118923 A1* | 5/2010 | Pal | H04B 1/0039 375/219 |
| 2010/0118924 A1* | 5/2010 | Pal | H04B 1/0039 375/219 |
| 2010/0119012 A1* | 5/2010 | Pal | H04B 1/0039 375/324 |
| 2010/0142416 A1* | 6/2010 | Kim | H04B 7/15557 370/281 |
| 2010/0159858 A1* | 6/2010 | Dent | H04B 1/123 455/131 |
| 2010/0189197 A1* | 7/2010 | Nakatani | H04B 1/28 375/340 |
| 2010/0265875 A1* | 10/2010 | Zhao | H04B 1/0007 370/316 |
| 2011/0057834 A1* | 3/2011 | Miller | G01S 19/37 342/357.25 |
| 2012/0252395 A1* | 10/2012 | Cheng | H04B 1/0053 455/319 |
| 2012/0294299 A1 | 11/2012 | Fernando | |
| 2013/0023226 A1* | 1/2013 | Dai | H04B 1/28 455/302 |
| 2013/0156134 A1* | 6/2013 | Galan | H04B 1/0071 375/340 |
| 2013/0287077 A1* | 10/2013 | Fernando | H04B 1/005 375/222 |
| 2014/0220920 A1* | 8/2014 | Fernando | H04W 52/0245 455/226.2 |

FOREIGN PATENT DOCUMENTS

| | | | |
|---|---|---|---|
| CN | 101273537 A | | 9/2008 |
| CN | 101534141 A | | 9/2009 |
| CN | 101611557 A | | 12/2009 |
| CN | 20143058 Y | | 3/2010 |
| CN | 102257734 A | | 11/2011 |
| CN | EP2421174 | * | 2/2012 ............ H04B 1/0053 |
| EP | 2421174 A1 | | 2/2012 |

OTHER PUBLICATIONS

Qualcomm Europe: "UE Implementation Impact due to 4C-HSDPA Operation", 3GPP Draft; R1-094067_UE_IMPL_IMPACT_4C_HSDPA, 3rd Generation Partnership Project (3GPP), Mobile Competence Centre ; 650, Route Des Lucioles ; F-06921 Sophia-Antip0lis Cedex ; France, no. Miyazaki; Oct. 12, 2009, Oct. 12, 2009 (Oct. 12, 2009), XP050388547, [retrieved on Oct. 6, 2009].

* cited by examiner

COMBINING MULTIPLE DESIRED SIGNALS INTO A SINGLE BASEBAND SIGNAL

CLAIM OF PRIORITY UNDER 35 U.S.C. §119

The present application for patent claims priority to Provisional Application No. 61/638,292 entitled "COMBINING MULTIPLE DESIRED SIGNALS INTO A SINGLE BASEBAND SIGNAL" filed Apr. 25, 2012, and assigned to the assignee hereof and hereby expressly incorporated by reference herein.

TECHNICAL FIELD

The present disclosure relates generally to wireless devices for communication systems. More specifically, the present disclosure relates to systems and methods for combining multiple desired signals into a single baseband signal.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput has also increased. One such way to increase downlink throughput is the use of carrier aggregation. In carrier aggregation, multiple carriers may be aggregated on the physical layer to provide the required bandwidth (and thus the required throughput).

The electronic devices have also become smaller and cheaper. To facilitate both the decrease in size and the decrease in cost, additional circuitry and more complex circuitry are being used on integrated circuits. Thus, any reduction in the die area used by circuitry may reduce both the size and cost of an electronic device. Benefits may be realized by improvements to electronic devices that allow an electronic device to participate in carrier aggregation while minimizing the cost and size of the electronic device.

SUMMARY

A transceiver for receiving multiple desired signals includes a first downconverter that receives a first received signal and a second downconverter that receives the first received signal. The transceiver also includes a first adder that receives an output of the first downconverter and a second received signal.

The first desired signal may be in a first band and the second desired signal may be in a second band. The second desired signal may be above an alias of a sampling frequency. The first downconverter and the second downconverter may be phase shifted from each other.

The first adder may output a combined analog signal that comprises the first desired signal and the second desired signal. The combined analog signal in sample domain may be at a baseband frequency. The second desired signal may be adjacent to the first desired signal in the combined analog signal. In addition, the second desired signal may not overlap the first desired signal in the sample domain of the combined analog signal.

A single analog-to-digital converter may be used to convert the combined analog signal to a digital signal. The single analog-to-digital converter may be on a modem. A single transceiver-modem coupling may be between the first adder and the single analog-to-digital converter.

In one configuration, the transceiver may also include a first low pass filter coupled between the output of the first downconverter and the input of the first adder, a second low pass filter coupled between an output of the second downconverter and an input of an analog-to-digital converter, and a bandpass filter that receives the second received signal and is coupled to the input of the first adder.

The transceiver may also include a first low noise amplifier that receives the first received signal and is coupled to the input of the first downconverter and the second downconverter. The transceiver may also include a second low noise amplifier that receives the second received signal and is coupled to the input of the bandpass filter. The transceiver may also include a third downconverter coupled between the output of the second low noise amplifier and the input of the bandpass filter. The third downconverter may convert the frequency of the second received signal to a frequency above baseband in an aliasing band.

The transceiver may also include a second adder that receives an output of the second downconverter and a third received signal. The first desired signal may be in a first band, the second desired signal may be in a second band and the third desired signal may be in a third band. The second adder may output a combined analog signal that comprises the first desired signal and the third desired signal. The combined analog signal in sample domain may be at a baseband frequency. The third desired signal may be adjacent to the first desired signal in the combined analog signal. The third desired signal may not overlap the first desired signal in the sample domain of the combined analog signal. The transceiver may also include a low noise amplifier that receives the third received signal and a bandpass filter that receives an output of the low noise amplifier. An output of the bandpass filter may be coupled to the second adder. The transceiver may also include a third downconverter coupled between the output of the low noise amplifier and an input of the bandpass filter. The third downconverter may convert the frequency of the third received signal to a frequency above baseband.

A method for receiving multiple desired signals is also described. A first received signal is downconverted to a baseband frequency using a first downconverter. The first received signal is downconverted to a baseband frequency using a second downconverter. An output of the first downconverter is combined with a second received signal to obtain a first combined analog signal. The first combined analog signal is converted to a digital signal using a first analog-to-digital converter.

An apparatus for receiving multiple desired signals is described. The apparatus includes means for downconverting a first received signal to a baseband, means for downconverting the first received signal to a baseband frequency, means for combining an output of the first downconverter with a second received signal to obtain a first combined analog signal, and means for converting the first combined analog signal to a digital signal.

DETAILED DESCRIPTION

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of third generation (3G) technology standards that use code division multiple access (CDMA) to send voice, data and signaling between wireless devices. CDMA2000 may include CDMA2000 1×, CDMA2000 EV-DO Rev. 0, CDMA2000 EV-DO Rev. A and CDMA2000 EV-DO Rev. B. 1× or 1×RTT refers to the core CDMA2000 wireless air interface standard. 1× more specifically refers to 1 times Radio Transmission Technology and indicates the same radio frequency (RF) bandwidth as used in IS-95. 1×RTT adds 64 additional traffic channels to the forward link. EV-DO refers to Evolution-Data Optimized. EV-DO is a telecommunications standard for the wireless transmission of data through radio signals.

Figure 1:
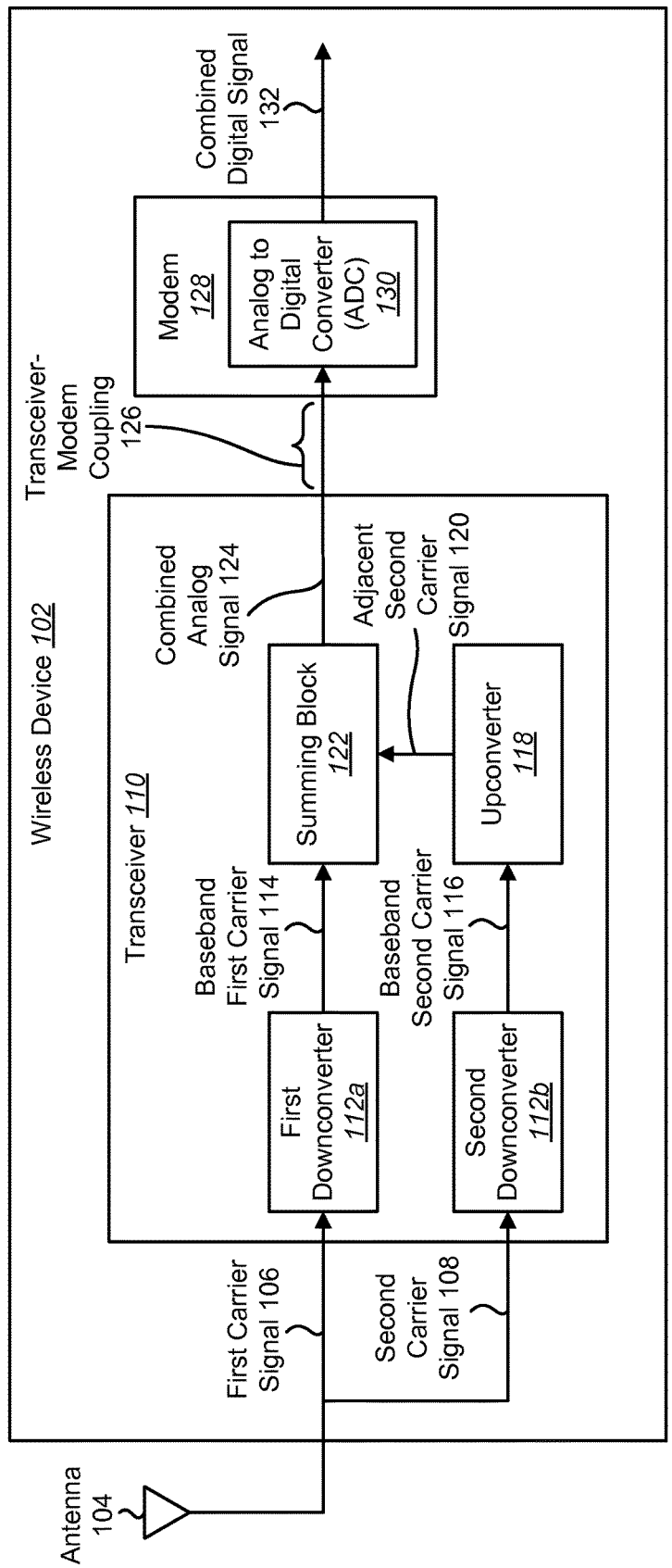
FIG. 1 shows a wireless device for use in the present systems and methods.

FIG. 1 shows a wireless device 102 for use in the present systems and methods. A wireless device 102 may be a wireless communication device or a base station. A base station is a station that communicates with one or more wireless communication devices. A base station may also be referred to as, and may include some or all of the functionality of, an access point, a broadcast transmitter, a NodeB, an evolved NodeB, etc. Each base station provides communication coverage for a particular geographic area. A base station may provide communication coverage for one or more wireless communication devices. The term "cell" can refer to a base station and/or its coverage area depending on the context in which the term is used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

Communications in a wireless communication system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The wireless device 102 may include an antenna 104. The antenna 104 may be used for both receiving and transmitting. In one configuration, the antenna 104 may receive signals over multiple carriers using carrier aggregation. In carrier aggregation, multiple carriers may be aggregated on the physical layer to provide the required bandwidth (and thus the required throughput).

The wireless device 102 may split a signal received by the antenna 104 into a first carrier signal 106 and a second carrier signal 108. The wireless device 102 may use a multiplexer, a duplexer or a quad-plexer (not shown) to separate the first carrier signal 106 and the second carrier signal 108. Additional carrier signals may also be received by the antenna 104.

The wireless device 102 may include a transceiver 110 and a modem 128. In order to receive multiple carrier signals that are non-adjacent, separate transceivers 110 may be needed for each carrier signal. Each transceiver 110 may require an analog-to-digital converter (ADC) 130 on the modem 128. Thus, a wireless device 102 capable of receiving multiple carrier signals may require multiple transceivers 110 and a modem 128 with multiple analog-to-digital converters (ADCs) 130. Furthermore, each transceiver 110 may require a transceiver-modem coupling 126. The use of multiple transceivers 110, multiple analog-to-digital converters (ADCs) 130 and multiple transceiver-modem couplings 126 may increase the size, cost and complexity of a wireless device 102 used for receiving multiple carrier signals. Instead, the wireless device 102 may include a transceiver 110 that can combine multiple carrier signals that are non-adjacent into a single combined analog signal 124. The combined analog signal 124 may then be processed by a single analog-to-digital converter (ADC) 130 on the modem 128, and thus the wireless device 102 requires only a single transceiver-modem coupling 126.

The transceiver 110 may include a first downconverter 112a and a second downconverter 112b. The first downconverter 112a may convert the first carrier signal 106 to a baseband first carrier signal 114 (i.e., the first downconverter 112a may convert the frequency of the first carrier signal 106 to the baseband frequency (i.e., centered at 0 hertz (Hz))). The second downconverter 112b may convert the second carrier signal 108 to a baseband second carrier signal 116. The transceiver 110 may also include an upconverter 118. The upconverter 118 may convert the baseband second carrier signal 116 to an adjacent second carrier signal 120 (i.e., the upconverter 118 may convert the frequency of the baseband second carrier signal 116 to be centered around a frequency greater than 0 Hz). As an example, the adjacent second carrier signal 120 may be centered at a frequency f that is adjacent to the baseband frequency. If a third carrier is used, another upconverter might convert a baseband third carrier signal to a frequency of 2f. It is important for the upconverter 118 to be after the second downconverter 112b (and thus for the second carrier signal 108 to be downconverted prior to being upconverted) to ensure that the first carrier signal 106 is at the baseband frequency and the second carrier signal 108 is at an adjacent frequency when combined.

In one configuration, the upconverter 118 may be an image reject (IR) mixer that removes undesirable images from the baseband second carrier signal 116. In another configuration, the upconverter 118 may be a single mixer. If the upconverter 118 is a single mixer, there may still be an image in the adjacent second carrier signal 120. However if the baseband filter (not shown) is very sharp, noise in the adjacent second carrier signal 120 may be lower due to the jammer and the image can be ignored at the baseband.

The transceiver 110 may include a summing block 122. The summing block 122 may receive the baseband first carrier signal 114 and the adjacent second carrier signal 120. The summing block 122 may combine the baseband first carrier signal 114 and the adjacent second carrier signal 120 to obtain a combined analog signal 124 without any degrading interference between the two signals. The combined analog signal 124 may be a wider baseband signal. Because multiple carrier signals are in the combined analog signal 124, only a single analog-to-digital converter (ADC) 130 on the modem 128 (and a single transceiver-modem coupling 126) is needed. The analog-to-digital converter (ADC) 130 may receive the combined analog signal 124 and generate a combined digital signal 132. The configuration of the second downconverter 112b and the upconverter 118 may additionally protect against interference from jammer signals adjacent to one or more of the carrier signals. If additional carriers are used, the additional carrier signals may also be upconverted to an adjacent frequency.

The proposed transceiver 110 architecture may be used in wireless communication links, wired communication links, optical communication links, etc.

Figure 2:
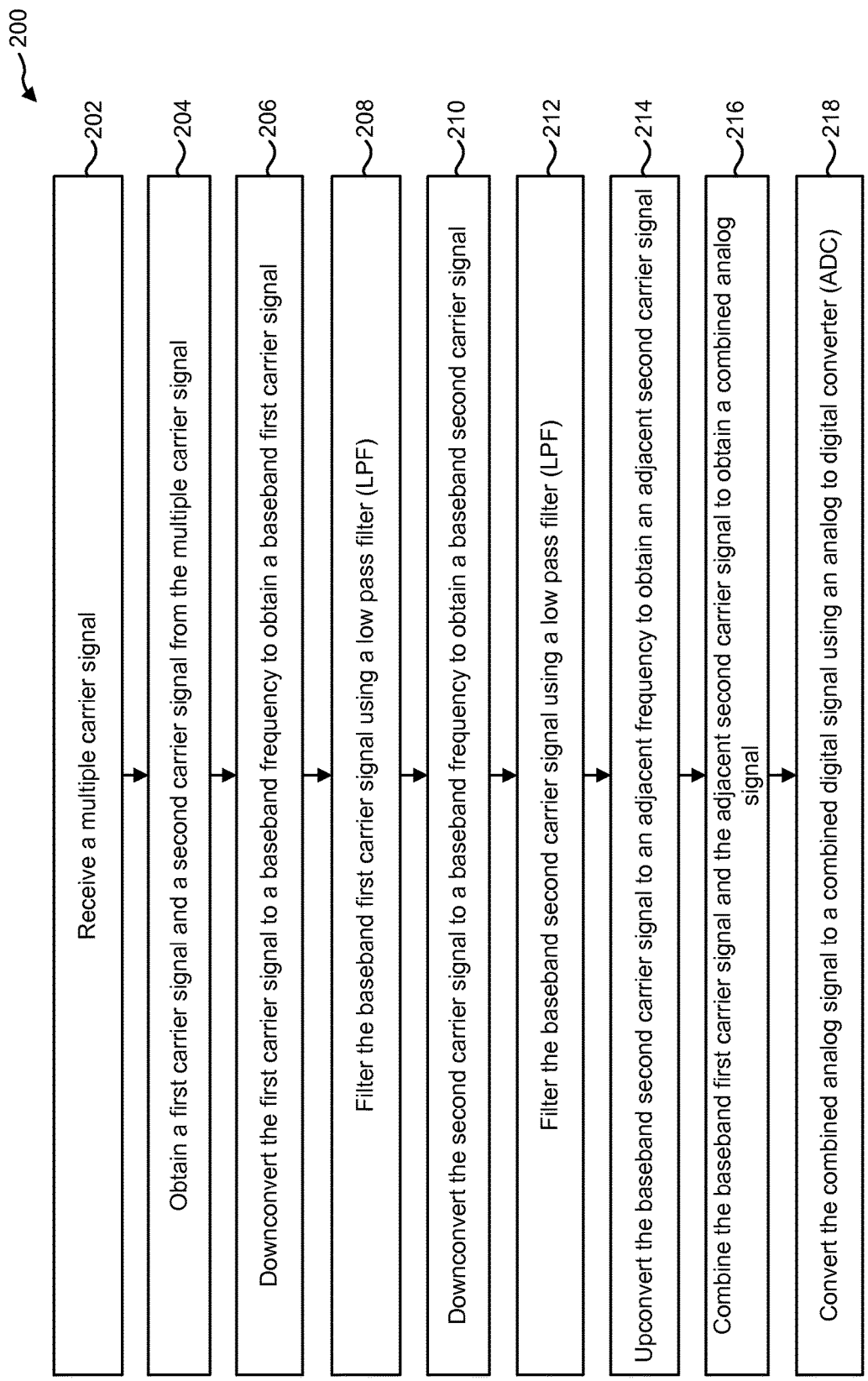
FIG. 2 is a flow diagram of a method for receiving multiple carrier signals using a single transceiver.

FIG. 2 is a flow diagram of a method 200 for receiving multiple carrier signals using a single transceiver 110. The method 200 may be performed by a wireless device 102. The wireless device 102 may be a wireless communication device or a base station. The wireless device 102 may receive 202 a multiple carrier signal. In one configuration, the multiple carrier signal may include a first carrier signal 106 and a second carrier signal 108. In another configuration, the multiple carrier signal may also include a third carrier signal. In yet another configuration, the multiple carrier signal may further include a fourth carrier signal.

The wireless device 102 may obtain 204 a first carrier signal 106 and a second carrier signal 108 from the multiple carrier signal. In one configuration, the wireless device 102 may use a duplexer to obtain 204 the first carrier signal 106 and the second carrier signal 108 from the multiple carrier signal. In another configuration, the wireless device 102 may use a quad-plexer to obtain 204 the first carrier signal 106 and the second carrier signal 108 from the multiple carrier signal. The wireless device 102 may downconvert 206 the first carrier signal 106 to a baseband frequency to obtain a baseband first carrier signal 114. In one configuration, the wireless device 102 may downconvert 206 the first carrier signal 106 using a first downconverter 112a. The wireless device 102 may filter 208 the baseband first carrier signal 114 using a low pass filter (LPF) (to remove noise).

The wireless device 102 may downconvert 210 the second carrier signal 108 to the baseband frequency to obtain a baseband second carrier signal 116. In one configuration, the wireless device 102 may downconvert 210 the second carrier signal 108 using a second downconverter 112b. The wireless device 102 may filter 212 the baseband second carrier signal 116 using a low pass filter (LPF). The wireless device 102 may then upconvert 214 the baseband second carrier signal 116 to an adjacent frequency to obtain an adjacent second carrier signal 120. In one configuration, the wireless device 102 may upconvert 214 the baseband second carrier signal 116 using an upconverter 118.

The wireless device 102 may combine 216 the baseband first carrier signal 114 and the adjacent second carrier signal 120 to obtain a combined analog signal 124. In one configuration, the wireless device 102 may use a summing block 122 to combine 216 baseband first carrier signal 114 and the adjacent second carrier signal 120. The wireless device 102 may then convert 218 the combined analog signal 124 to a combined digital signal 132 using an analog-to-digital converter (ADC) 130.

Figure 3:
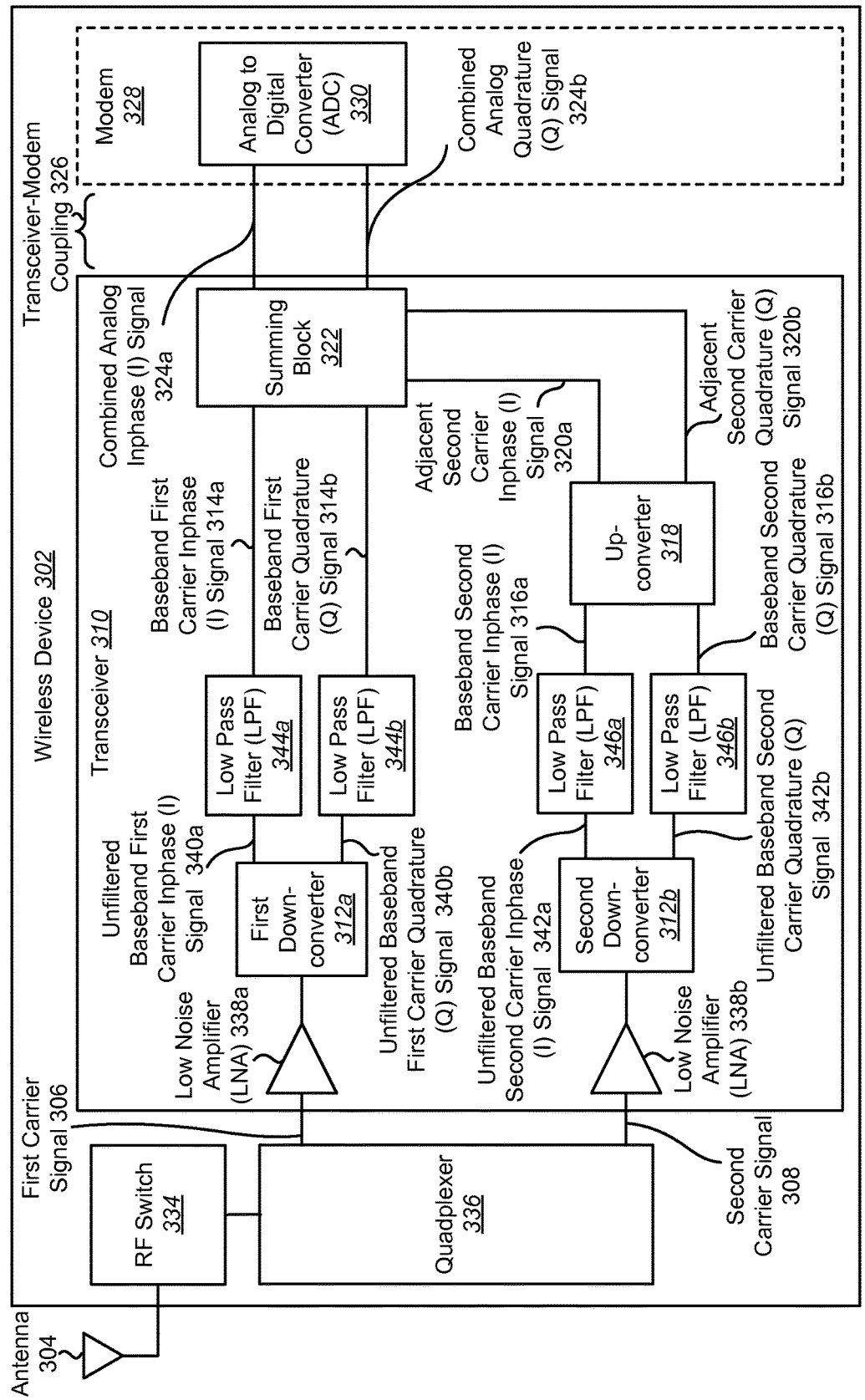
FIG. 3 is a block diagram illustrating another wireless device for use in the present systems and methods.

FIG. 3 is a block diagram illustrating another wireless device 302 for use in the present systems and methods. The wireless device 302 of FIG. 3 may be one configuration of the wireless device 102 of FIG. 1. The wireless device 302 may include an antenna 304. The antenna 304 may be used for both receiving and transmitting. In one configuration, the antenna 304 may receive signals over multiple carriers using carrier aggregation.

The wireless device 302 may include an RF switch 334, a quad-plexer 336, a transceiver 310 and a modem 328. A signal with multiple carriers may be passed through the RF switch 334 and the quad-plexer 336 to separate each carrier signal. For example, the quad-plexer 336 may output a first carrier signal 306 to the transceiver 310 and a second carrier signal 308 to the transceiver 310. Additional carrier signals may also be received by the antenna 304.

The first carrier signal 306 may be amplified by a first low noise amplifier (LNA) 338a and downconverted to the baseband frequency by a first downconverter 312a. The output of the first downconverter 312a may have a real component (referred to as inphase (I)) and an imaginary component (referred to as quadrature (Q)). The inphase (I) and quadrature (Q) signals may be related with the equation I+jQ. The inphase (I) signal output by the first downconverter 312 (referred to as the unfiltered baseband first carrier inphase (I) signal 340a) may be passed through a first low pass filter (LPF) 344a to remove noise. The output of the first low pass filter (LPF) 344a may be the baseband first carrier inphase (I) signal 314a. The quadrature (Q) signal output by the first downconverter 312a (referred to as the unfiltered baseband first carrier quadrature (Q) signal 340b) may be passed through a second low pass filter (LPF) 344b to remove noise. The output of the second low pass filter (LPF) 344b may be the baseband first carrier quadrature (Q) signal 314b.

The second carrier signal 308 may be amplified by a second low noise amplifier (LNA) 338b and downconverted to the baseband frequency by a second downconverter 312b. The output of the second downconverter 312b may have an inphase (I) component and a quadrature (Q) component. The inphase (I) signal output by the second downconverter 312b (referred to as the unfiltered baseband second carrier inphase (I) signal 342a) may be passed through a third low pass filter (LPF) 346a to remove noise. The output of the third low pass filter (LPF) 346a may be the baseband second carrier inphase (I) signal 316a. The quadrature (Q) signal output by the second downconverter 312b (referred to as the unfiltered baseband second carrier quadrature (Q) signal 342b) may be passed through a fourth low pass filter (LPF) 346b to remove noise. The output of the fourth low pass filter (LPF) 346b may be the baseband second carrier quadrature (Q) signal 316b.

The transceiver 310 may also include an upconverter 318. The upconverter 318 may convert the baseband second carrier inphase (I) signal 316a to an adjacent second carrier inphase (I) signal 320a and the baseband second carrier quadrature (Q) signal 316b to an adjacent second carrier quadrature (Q) signal 320b.

The transceiver 310 may further include a summing block 322. The summing block 322 may receive the baseband first carrier inphase (I) signal 314a, the baseband first carrier quadrature (Q) signal 314b, the adjacent second carrier inphase (I) signal 320a and the adjacent second carrier quadrature (Q) signal 320b. The summing block 322 may combine the baseband first carrier inphase (I) signal 314a and the adjacent second carrier inphase (I) signal 320a to obtain a combined analog inphase (I) signal 324a without any degrading interference between the two signals. The summing block 322 may also combine the baseband first carrier quadrature (Q) signal 314b and the adjacent second carrier quadrature (Q) signal 320b to obtain a combined analog quadrature (Q) signal 324b without any degrading interference between the two signals. Because multiple carrier signals are in the combined analog signals, only a single analog-to-digital converter (ADC) 330 on the modem 328 (and a single transceiver-modem coupling pair 326) is needed. The analog-to-digital converter (ADC) 330 may receive the combined analog inphase (I) signal 324a and the combined analog quadrature (Q) signal 324b and generate a combined digital signal.

Figure 4:
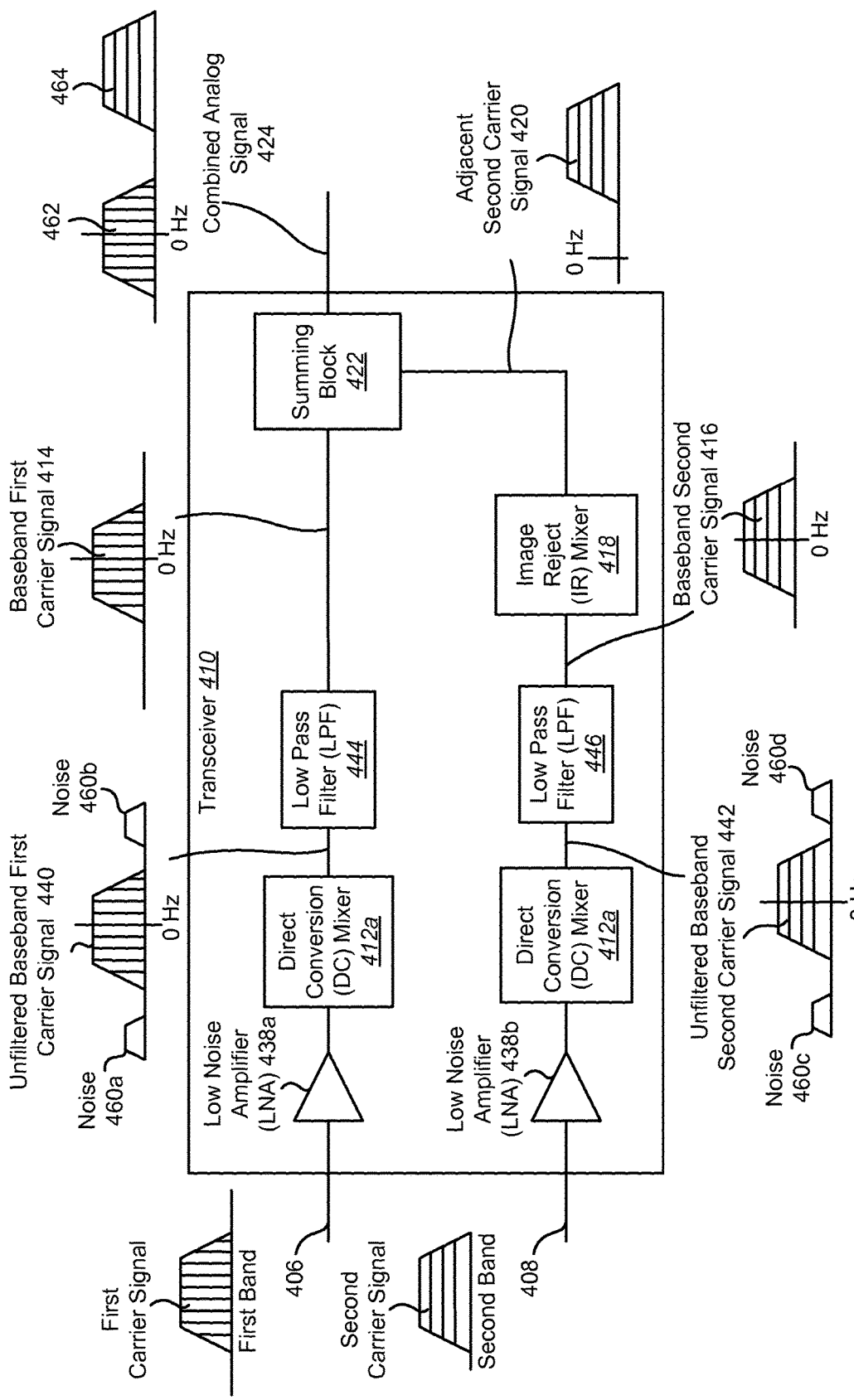
FIG. 4 is a block diagram of a transceiver that can combine multiple carrier signals that are non-adjacent into a single combined analog signal.

FIG. 4 is a block diagram of a transceiver 410 that can combine multiple carrier signals that are non-adjacent into a single combined analog signal 424. The transceiver 410 of FIG. 4 may be one configuration of the transceiver 110 of FIG. 1. The transceiver 410 may combine multiple carrier signals into a combined analog signal 424 that can be converted to a digital signal using a single analog-to-digital converter (ADC) 130.

The transceiver 410 may receive a first carrier signal 406. A first low noise amplifier (LNA) 438a may amplify the first carrier signal 406. The first carrier signal 406 may then be downconverted to the baseband frequency by a first direct conversion (DC) mixer 412a. A direct conversion (DC) mixer 412 may be one configuration of a downconverter 112. The first direct conversion (DC) mixer 412a may output an unfiltered baseband first carrier signal 440. The unfiltered baseband first carrier signal 440 may include unwanted noise 460a-b. The transceiver 410 may pass the unfiltered baseband first carrier signal 440 through a first low pass filter (LPF) 444 to obtain a baseband first carrier signal 414. The low pass filter (LPF) 444 may remove the noise 460a-b from the unfiltered baseband first carrier signal 440.

The transceiver 410 may also receive a second carrier signal 408. A second low noise amplifier (LNA) 438b may amplify the second carrier signal 408. The second carrier signal 408 may then be downconverted to the baseband frequency by a second direct conversion (DC) mixer 412b. The second direct conversion (DC) mixer 412b may output an unfiltered baseband second carrier signal 442. The unfiltered baseband second carrier signal 442 may include unwanted noise 460c-d. The transceiver 410 may pass the unfiltered baseband second carrier signal 442 through a second low pass filter (LPF) 446 to obtain a baseband second carrier signal 416. The low pass filter (LPF) 446 may remove the noise 460c-d from the unfiltered baseband second carrier signal 442.

The transceiver 410 may pass the baseband second carrier signal 416 through an image reject (IR) mixer 418. The image reject (IR) mixer 418 of FIG. 4 may be one configuration of the upconverter 118 of FIG. 1. The image reject (IR) mixer 418 may upconvert the baseband second carrier signal 416 to an adjacent frequency (i.e., a frequency higher than bandwidth to avoid overlap with a baseband signal). The image reject (IR) mixer 418 may shift a signal and remove undesirable images (because of how the image reject (IR) mixer 418 is implemented) that might otherwise interfere with other signals when summed together. The image reject (IR) mixer 418 may protect a combined signal from jammer signals adjacent to the desired signals. The image reject (IR) mixer 418 may output an adjacent second carrier signal 420.

The transceiver 410 may include a summing block 422. The summing block 422 may receive the baseband first carrier signal 414 and the adjacent second carrier signal 420. The summing block 422 may then output a combined analog signal 424. From the graph, it is shown that the adjacent second carrier portion 464 of the combined analog signal 424 does not interfere with the baseband first carrier portion 462.

Figure 5:
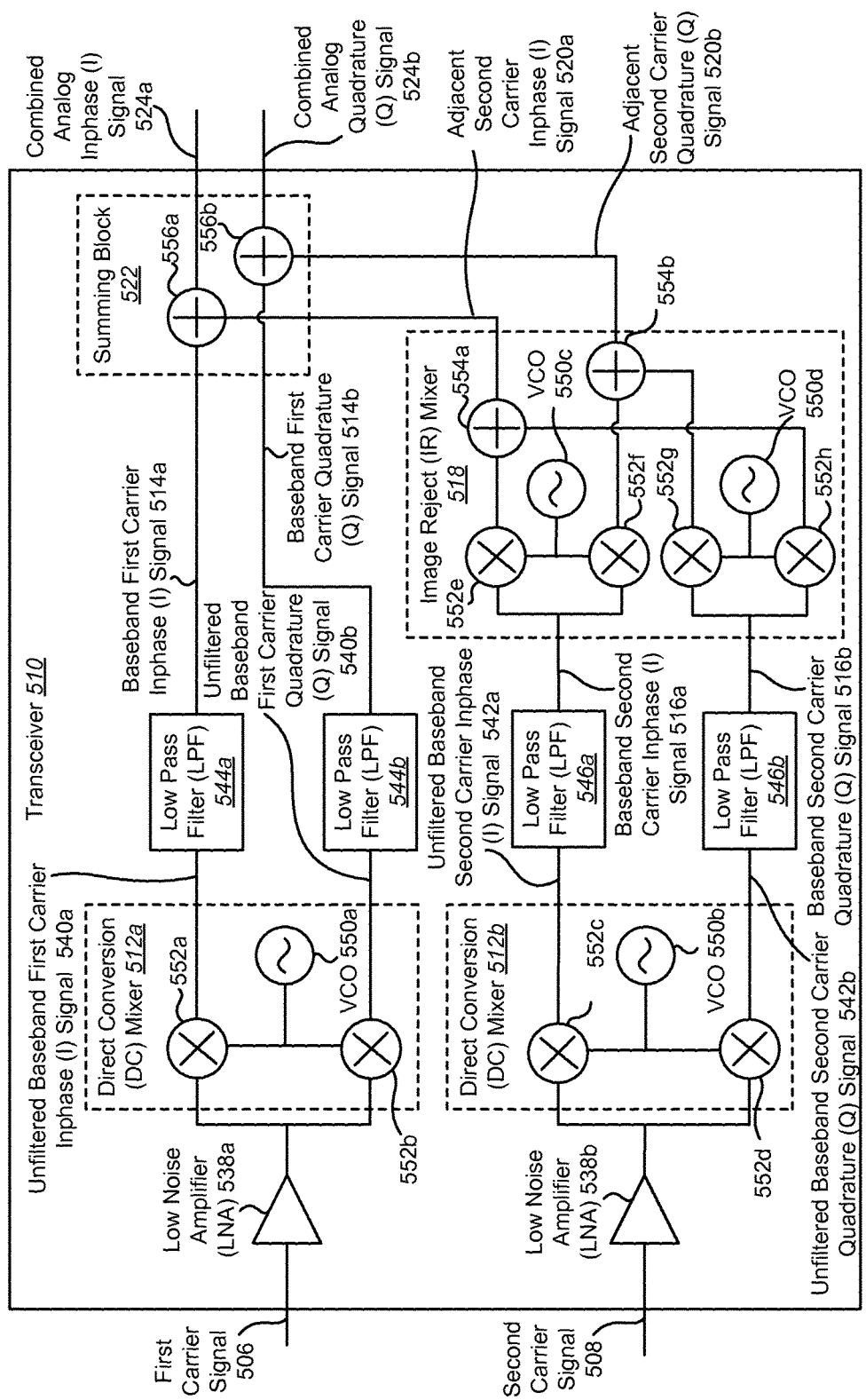
FIG. 5 is a block diagram illustrating a more detailed transceiver that can combine multiple carrier signals that are non-adjacent into a single combined analog signal.

FIG. 5 is a block diagram illustrating a more detailed transceiver 510 that can combine multiple carrier signals that are non-adjacent into a single combined analog signal.

The transceiver 510 of FIG. 5 may be one configuration of the transceiver 110 of FIG. 1. The transceiver 510 may be part of a wireless device 102 that also includes a modem 128. The transceiver 510 may receive a first carrier signal 506 and a second carrier signal 508. The transceiver 510 may then output a combined analog signal 524 (with an inphase (I) component (referred to as the combined analog inphase (I) signal 524a) and a quadrature (Q) component (referred to as the combined analog quadrature (Q) signal 524b)). The combined analog signal 524 may then be processed by a single analog-to-digital converter (ADC) 130 on the modem 128, and thus the wireless device 102 requires only a single transceiver-modem coupling 126.

The first carrier signal 506 may be amplified by a first low noise amplifier (LNA) 538a and downconverted to the baseband frequency by a first direct conversion (DC) mixer 512a. The first direct conversion (DC) mixer 512a of FIG. 5 may be one configuration of the first downconverter 112a of FIG. 1. The first direct conversion (DC) mixer 512a may include a first mixer 552a and a second mixer 552b that are phase shifted from each other. Both the first mixer 552a and the second mixer 552b may be coupled to a voltage controlled oscillator (VCO) 550a. The first mixer 552a may downconvert the first carrier signal 506 to an unfiltered baseband first carrier inphase (I) signal 540a. The unfiltered baseband first carrier inphase (I) signal 540a may be passed through a low pass filter (LPF) 544a to obtain a baseband first carrier inphase (I) signal 514a. The second mixer 552b may downconvert the first carrier signal 506 to an unfiltered baseband first carrier quadrature (Q) signal 540b. The unfiltered baseband first carrier quadrature (Q) signal 540b may be passed through a low pass filter (LPF) 544b to obtain a baseband first carrier quadrature (Q) signal 514b.

The second carrier signal 508 may be amplified by a second low noise amplifier (LNA) 538b and downconverted to the baseband frequency by a second direct conversion (DC) mixer 512b. The second direct conversion (DC) mixer 512b of FIG. 5 may be one configuration of the second downconverter 112b of FIG. 1. The second direct conversion (DC) mixer 512b may include a third mixer 552c and a fourth mixer 552d that are phase shifted from each other. Both the third mixer 552c and the fourth mixer 552d may be coupled to a voltage controlled oscillator (VCO) 550b. The third mixer 552c may downconvert the second carrier signal 508 to an unfiltered baseband second carrier inphase (I) signal 542a. The unfiltered baseband second carrier inphase (I) signal 542a may be passed through a low pass filter (LPF) 546a to obtain a baseband second carrier inphase (I) signal 516a. The fourth mixer 552d may downconvert the second carrier signal 508 to an unfiltered baseband second carrier quadrature (Q) signal 542b. The unfiltered baseband second carrier quadrature (Q) signal 542b may be passed through a low pass filter (LPF) 546b to obtain a baseband second carrier quadrature (Q) signal 516b.

The transceiver 510 may also include an image reject (IR) mixer 518. The image reject (IR) mixer 518 of FIG. 5 may be one configuration of the upconverter 118 of FIG. 1. The image reject (IR) mixer 518 may include a fifth mixer 552e, a sixth mixer 552f, a seventh mixer 552g and an eighth mixer 552h. The fifth mixer 552e and the sixth mixer 552f may be coupled to a voltage controlled oscillator (VCO) 550c and may be phase shifted from each other. The seventh mixer 552g and the eighth mixer 552h may be coupled to a voltage controlled oscillator (VCO) 550d and may be phase shifted from each other.

The fifth mixer 552e may upconvert the baseband second carrier inphase (I) signal 516a. The eighth mixer 552h may upconvert the baseband second carrier quadrature (Q) signal 516b. The output of the fifth mixer 552e and the output of the eighth mixer 552h may be added together using an adder 554a to obtain an adjacent second carrier inphase (I) signal 520a. The sixth mixer 552f may upconvert the baseband second carrier inphase (I) signal 516a. The seventh mixer 552g may upconvert the baseband second carrier quadrature (Q) signal 516b. The output of the sixth mixer 552f and the output of the seventh mixer 552g may be added together using an adder 554b to obtain an adjacent second carrier quadrature (Q) signal 520b.

The transceiver 510 may further include a summing block 522. The summing block 522 may include a first adder 556a and a second adder 556b. The first adder 556a may receive the baseband first carrier inphase (I) signal 514a and the adjacent second carrier inphase (I) signal 520a. The first adder 556a may then output a combined analog inphase (I) signal 524a. The second adder 556b may receive the baseband first carrier quadrature (Q) signal 514b and the adjacent second carrier quadrature (Q) signal 520b. The second adder 556b may then output a combined analog quadrature (Q) signal 524b. Because multiple carrier signals are in the combined analog inphase (I) signal 524a and the combined analog quadrature (Q) signal 524b, only a single analog-to-digital converter (ADC) 130 on the modem 128 (and a single transceiver-modem coupling pair 126) is needed.

Figure 6:
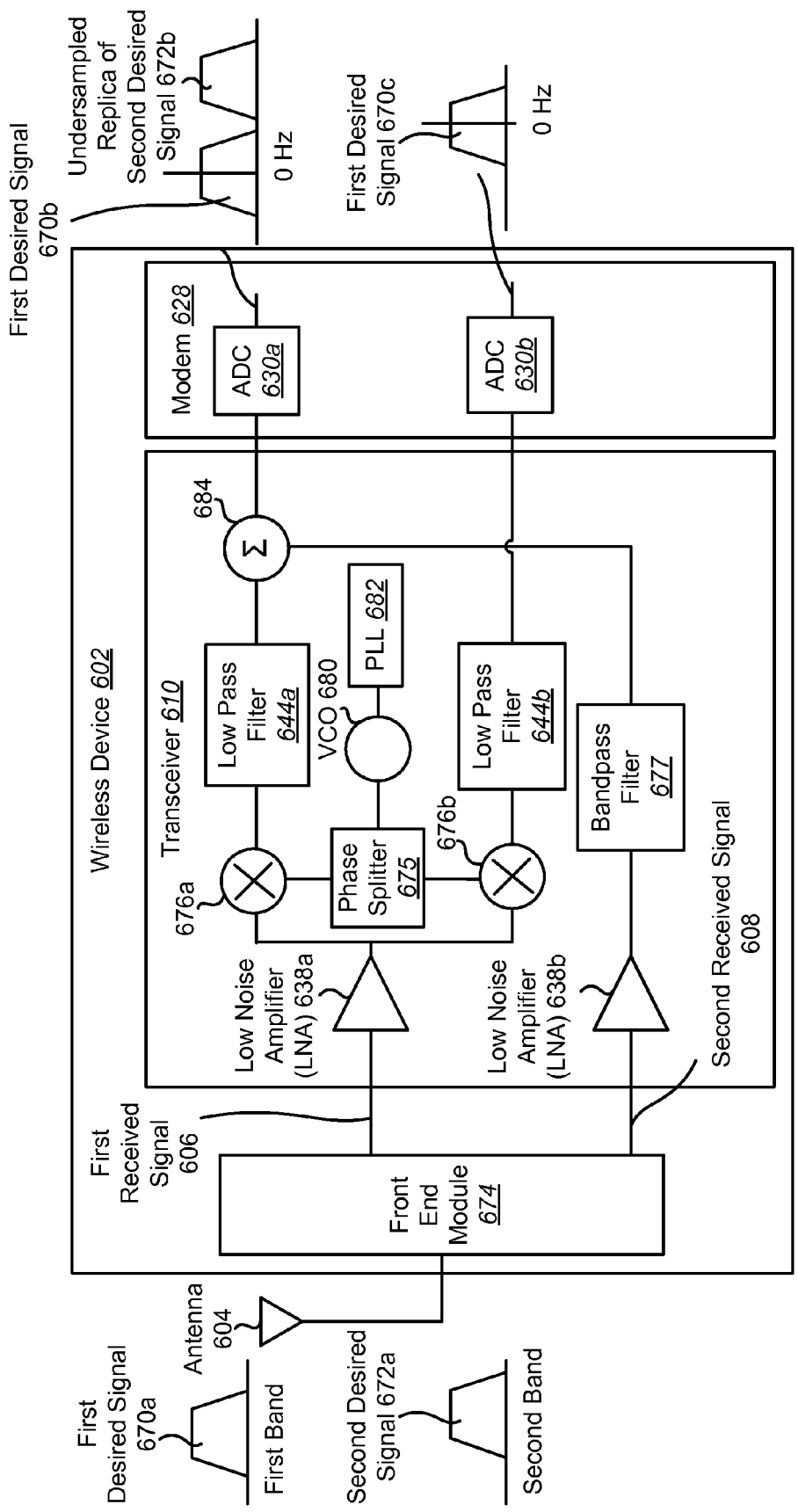
FIG. 6 is a block diagram illustrating a wireless communication device for use in the present systems and methods.

FIG. 6 is a block diagram illustrating a wireless device 602 for use in the present systems and methods. The wireless device 602 of FIG. 6 may be one configuration of the wireless device 102 of FIG. 1. The wireless device 602 may include an antenna 604 for receiving wireless signals.

The antenna 604 may receive a first desired signal 670a in a first band and a second desired signal 672a in a second band. The antenna 604 may be coupled to a front end module 674 on the wireless device 602. The front end module 674 may include switches, filters, splitters, etc. The front end module 674 may output a first received signal 606 and a second received signal 608. The first received signal 606 and the second received signal 608 may each include components of both the first desired signal 670a and the second desired signal 672a. Both the first received signal 606 and the second received signal 608 may be passed through a transceiver 610 on the wireless device 602. The transceiver 610 of FIG. 6 may be one configuration of the transceiver 110 of FIG. 1.

The first received signal 606 may be passed through a first low noise amplifier (LNA) 638a. The output of the first low noise amplifier (LNA) 638a may be coupled to a first mixer 676a and a second mixer 676b. The transceiver 610 may include a phase locked loop (PLL) 682 coupled to a voltage controlled oscillator (VCO) 680. The voltage controlled oscillator (VCO) 680 may provide a local oscillator (LO) signal to a phase splitter 675. The phase splitter 675 may split the phase of the local oscillator (LO) signal and provide downconverting signals to the first mixer 676a and the second mixer 676b. The output of the first mixer 676a may be coupled to a first low pass filter 644a. The output of the second mixer 676b may be coupled to a second low pass filter 644b.

The second received signal 608 may be passed through a second low noise amplifier (LNA) 638b. The output of the second low noise amplifier (LNA) 638b may be coupled to a bandpass filter 677. The output of the bandpass filter 677 does not require a frequency conversion block.

The transceiver 610 may include an adder 684. The adder 684 may receive the output of the first low pass filter 644a and the output of the bandpass filter 677. The output of the adder 684 may be passed through a first analog-to-digital converter (ADC) 630a. In one configuration, a single transceiver-modem coupling may be used between the adder 684 and the analog-to-digital converter (ADC) 630a. The first analog-to-digital converter (ADC) 630a may be in a modem 628 on the wireless device 602. The output of the first analog-to-digital converter (ADC) 630a may include the first desired signal 670b and the undersampled replica of the second desired signal 672b. The output of the second low pass filter 644b may be passed through a second analog-to-digital converter (ADC) 630b on the modem 628. The output of the second analog-to-digital converter (ADC) 630b may be the first desired signal 670c.

Figure 7:
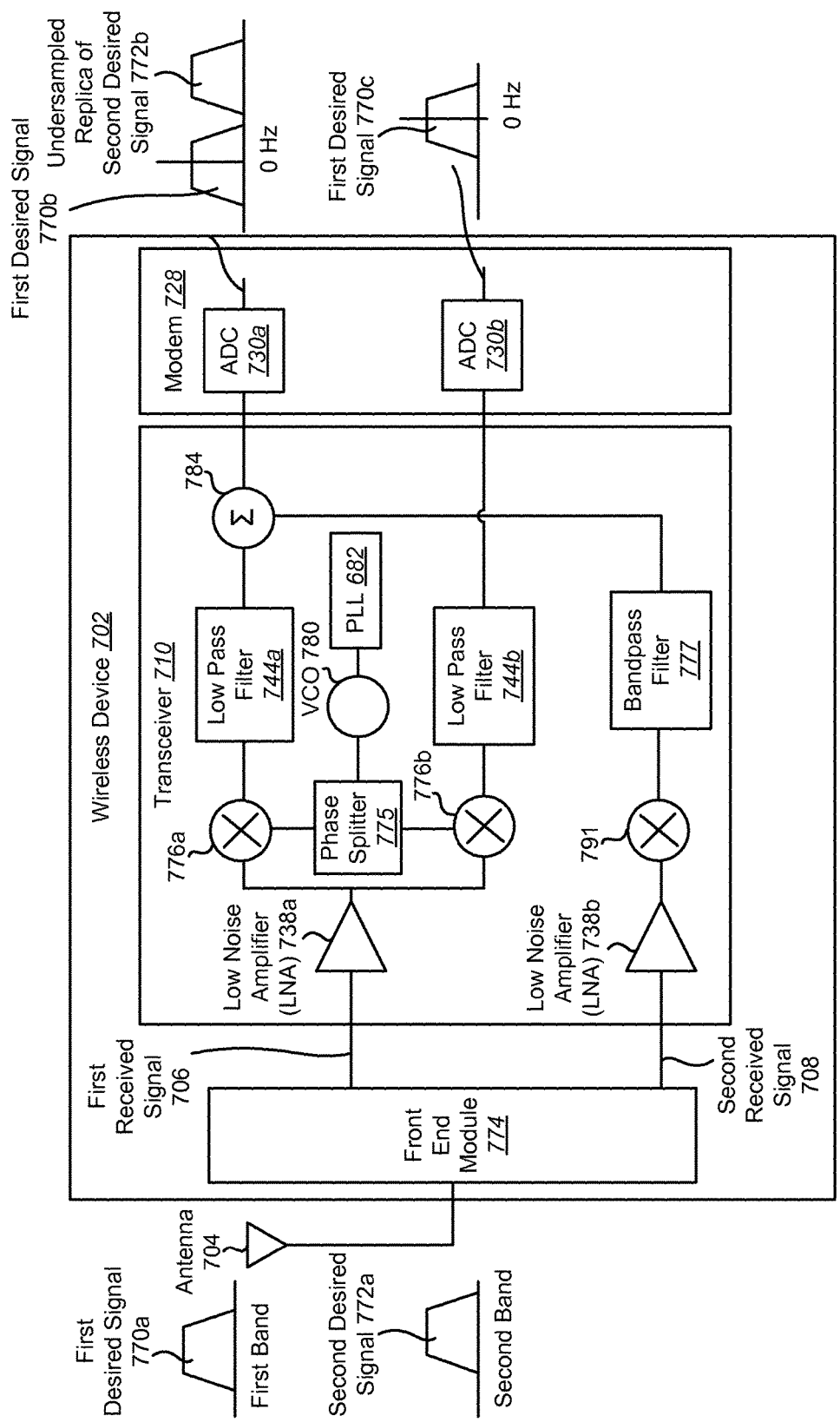
FIG. 7 is a block diagram illustrating another wireless device for use in the present systems and methods.

FIG. 7 is a block diagram illustrating another wireless device 702 for use in the present systems and methods. The wireless device 702 of FIG. 7 may be one configuration of the wireless device 102 of FIG. 1. The wireless device 702 may include an antenna 704 for receiving wireless signals.

The antenna 704 may receive a first desired signal 770a in a first band and a second desired signal 772a in a second band. The antenna 704 may be coupled to a front end module 774 on the wireless device 702. The front end module 774 may include switches, filters, splitters, etc. The front end module 774 may output a first received signal 706 and a second received signal 708. The first received signal 706 and the second received signal 708 may each include components of both the first desired signal 770a and the second desired signal 772a. Both the first received signal 706 and the second received signal 708 may be passed through a transceiver 710 on the wireless device 702. The transceiver 710 of FIG. 7 may be one configuration of the transceiver 110 of FIG. 1.

The first received signal 706 may be passed through a first low noise amplifier (LNA) 738a. The output of the first low noise amplifier (LNA) 738a may be coupled to a first mixer 776a and a second mixer 776b. The transceiver 710 may include a phase locked loop (PLL) 782 coupled to a voltage controlled oscillator (VCO) 780. The voltage controlled oscillator (VCO) 780 may provide a local oscillator (LO) signal to a phase splitter 775. The phase splitter 775 may split the phase of the local oscillator (LO) signal and provide downconverting signals to the first mixer 776a and the second mixer 776b. The output of the first mixer 776a may be coupled to a first low pass filter 744a. The output of the second mixer 776b may be coupled to a second low pass filter 744b.

The second received signal 708 may be passed through a second low noise amplifier (LNA) 738b. The output of the second low noise amplifier (LNA) 738b may be coupled to a mixer 791. The mixer 791 may downconvert the frequency of the second received signal 708 to a frequency above baseband (but below the frequency of the second received signal 708). The output of the mixer 791 may be coupled to a bandpass filter 777.

The transceiver 710 may include an adder 784. The adder 784 may receive the output of the first low pass filter 744a and the output of the bandpass filter 777. The output of the adder 784 may be passed through a first analog-to-digital converter (ADC) 730a. In one configuration, a single transceiver-modem coupling may be used between the adder 784 and the analog-to-digital converter (ADC) 730a. The first analog-to-digital converter (ADC) 730a may be in a modem 728 on the wireless device 702. The output of the first analog-to-digital converter (ADC) 730a may include the first desired signal 770b and the undersampled replica of the second desired signal 772b. The output of the second low pass filter 744b may be passed through a second analog-to-digital converter (ADC) 730b on the modem 728. The output of the second analog-to-digital converter (ADC) 730b may be the first desired signal 770c.

Figure 8:
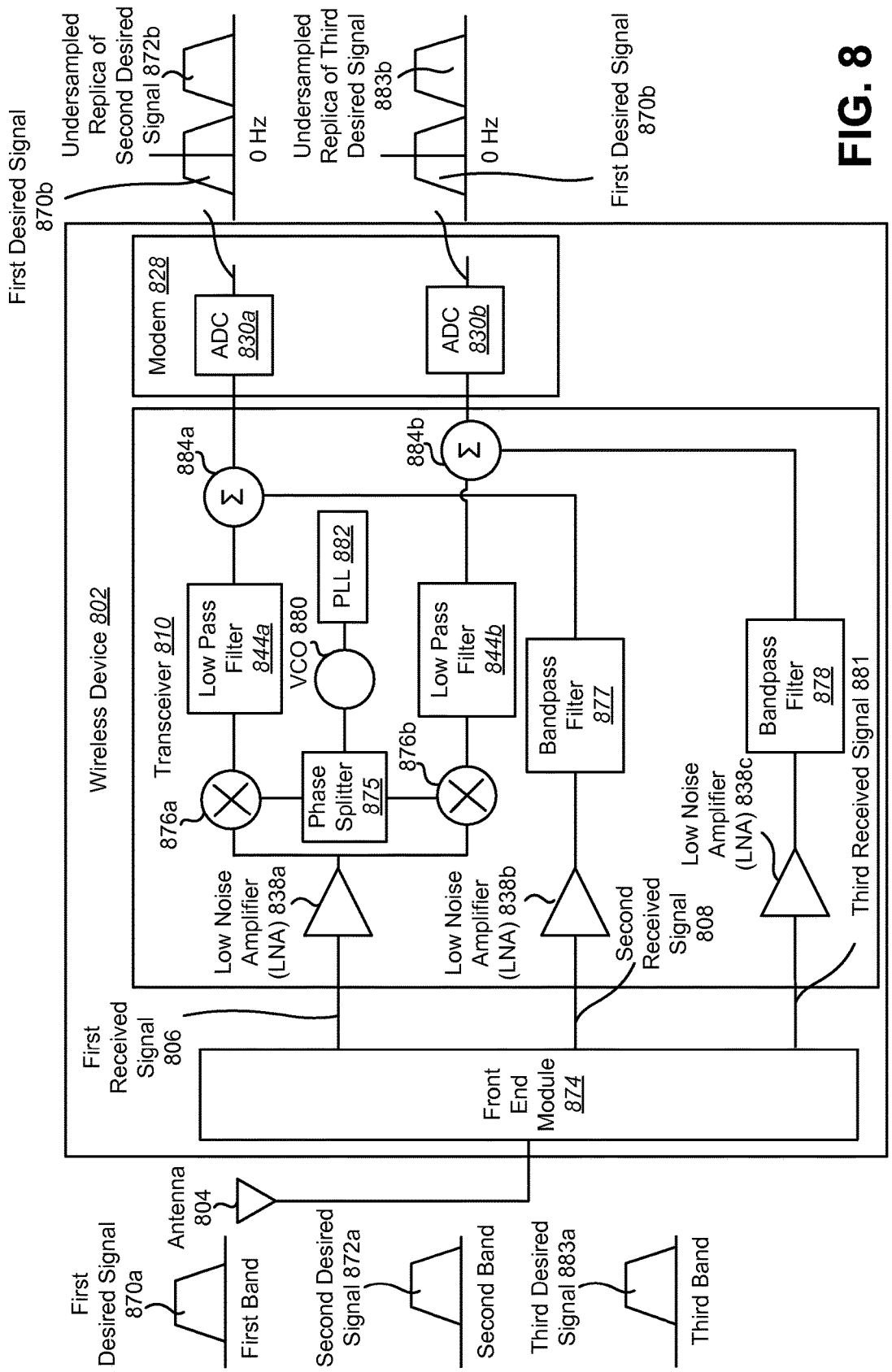
FIG. 8 is a block diagram illustrating yet another wireless device for use in the present systems and methods.

FIG. 8 is a block diagram illustrating yet another wireless device 802 for use in the present systems and methods. The wireless device 802 of FIG. 8 may be one configuration of the wireless device 102 of FIG. 1. The wireless device 802 may include an antenna 804 for receiving wireless signals.

The antenna 804 may receive a first desired signal 870a in a first band, a second desired signal 872a in a second band and a third desired signal 883a in a third band. The antenna 804 may be coupled to a front end module 874 on the wireless device 802. The front end module 874 may include switches, filters, splitters, etc. The front end module 874 may output a first received signal 806, a second received signal 808 and a third received signal 881. The first received signal 806, the second received signal 808 and the third received signal 881 may each include components of the first desired signal 870a, the second desired signal 872a and the third desired signal 883a. The first received signal 806, the second received signal 808 and the third received signal 881 may be passed through a transceiver 810 on the wireless device 802. The transceiver 810 of FIG. 8 may be one configuration of the transceiver 110 of FIG. 1.

The first received signal 806 may be passed through a first low noise amplifier (LNA) 838a. The output of the first low noise amplifier (LNA) 838a may be coupled to a first mixer 876a and a second mixer 876b. The transceiver 810 may include a phase locked loop (PLL) 882 coupled to a voltage controlled oscillator (VCO) 880. The voltage controlled oscillator (VCO) 880 may provide a local oscillator (LO) signal to a phase splitter 875. The phase splitter 875 may split the phase of the local oscillator (LO) signal and provide downconverting signals to the first mixer 876a and the second mixer 876b. The output of the first mixer 876a may be coupled to a first low pass filter 844a. The output of the second mixer 876b may be coupled to a second low pass filter 844b.

The second received signal 808 may be passed through a second low noise amplifier (LNA) 838b. The output of the second low noise amplifier (LNA) 838b may be coupled to a bandpass filter 877. The output of the bandpass filter 877 does not require a frequency conversion block.

The third received signal 881 may be passed through a third low noise amplifier (LNA) 838c. The output of the third low noise amplifier (LNA) 838c may be coupled to a bandpass filter 878. The output of the bandpass filter 878 does not require a frequency conversion block. A downconverter (not shown) may be placed between the second low noise amplifier (LNA) 838b and the bandpass filter 877 and/or between the third low noise amplifier (LNA) 838c and the bandpass filter 878.

The transceiver 810 may include a first adder 884a and a second adder 884b. The first adder 884a may receive the output of the first low pass filter 844a and the output of the bandpass filter 877. The output of the first adder 884a may be passed through a first analog-to-digital converter (ADC) 830a. In one configuration, a single transceiver-modem coupling may be used between the first adder 884a and the analog-to-digital converter (ADC) 830a. The first analog-to-digital converter (ADC) 830a may be in a modem 828 on the wireless device 802. The output of the first analog-to-digital converter (ADC) 830a may include the first desired signal 870b and the undersampled replica of the second desired signal 872b. The second adder may receive the output of the second low pass filter 844b and the output of the bandpass filter 878. The output of the second adder 884b may be passed through a second analog-to-digital converter (ADC) 830*b* on the modem 828. The output of the second analog-to-digital converter (ADC) 830*b* may include the first desired signal 870*c* and the undersampled replica of the third desired signal 883*b*.

Figure 9:
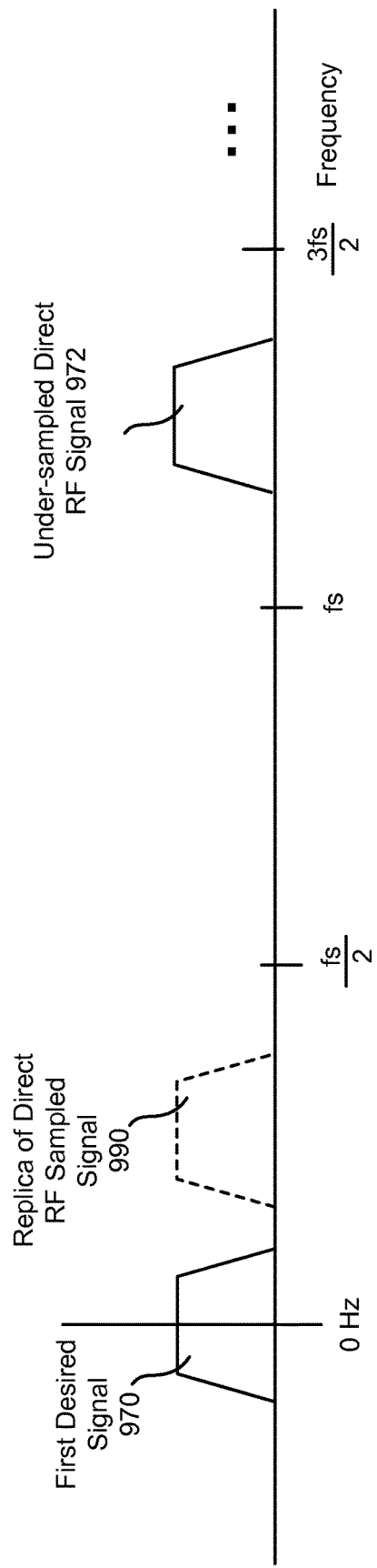
FIG. 9 is a graph illustrating the frequencies of received signals.

FIG. 9 is a graph illustrating the frequencies of received signals. The first desired signal 970 is shown centered at a frequency of 0 hertz (Hz) (baseband). The undersampled replica of the second desired signal 672*b* may be at a frequency above baseband. For example, the undersampled replica of the second desired signal 672*b* may be an undersampled direct RF signal 972 at a frequency that is an alias above the sampling frequency fs (e.g., at a frequency above θfs). A replica of the direct RF sampled signal 990 is shown at a frequency higher than baseband. The replica of direct RF sampled signal 990 may be at a frequency sufficiently higher than baseband so that overlap of the first desired signal 970 and the replica of RF sampled signal 990 does not occur.

Figure 10:
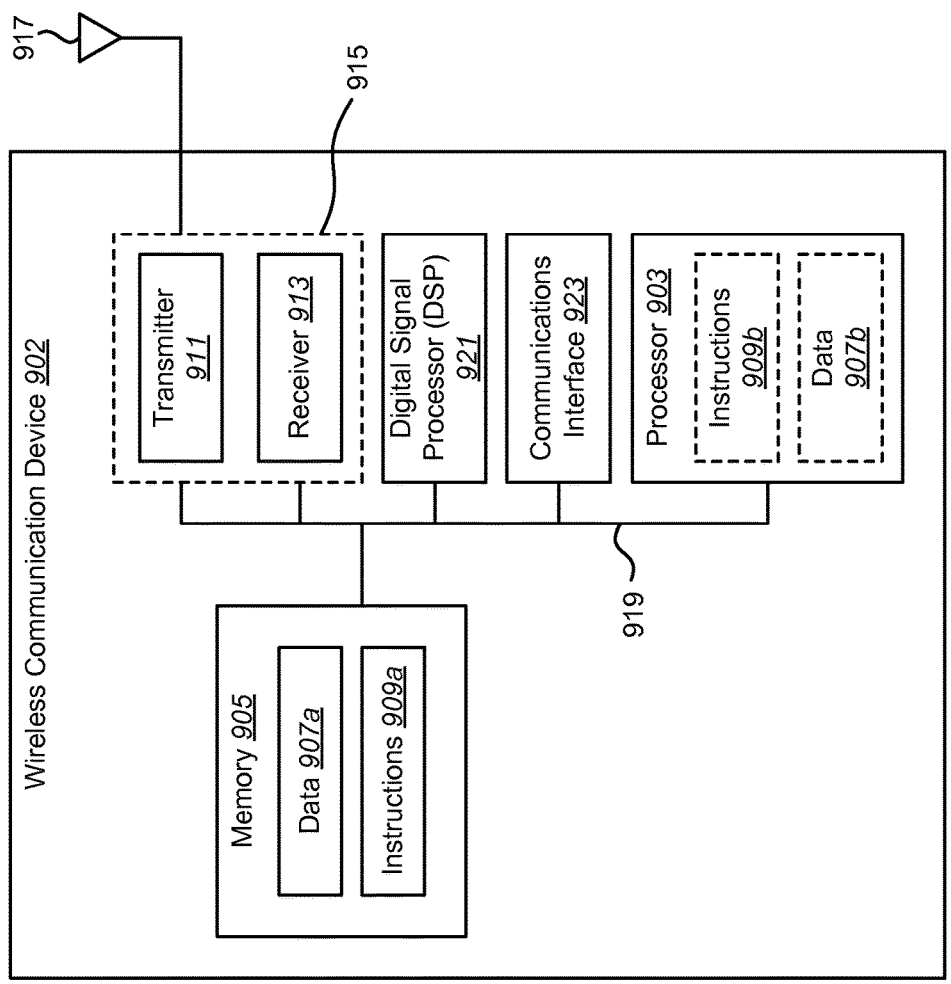
FIG. 10 illustrates certain components that may be included within a wireless communication device.

FIG. 10 illustrates certain components that may be included within a wireless communication device 902. The wireless communication device 902 may be an access terminal, a mobile station, a user equipment (UE), etc. The wireless communication device 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 10, in an alternative configuration, a combination of processors (e.g., an ARM and DSP) could be used.

The wireless communication device 902 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907*a* and instructions 909*a* may be stored in the memory 905. The instructions 909*a* may be executable by the processor 903 to implement the methods disclosed herein. Executing the instructions 909*a* may involve the use of the data 907*a* that is stored in the memory 905. When the processor 903 executes the instructions 909, various portions of the instructions 909*b* may be loaded onto the processor 903, and various pieces of data 907*b* may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiple transmitters, multiple antennas, multiple receivers and/or multiple transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 10 as a bus system 919.

Figure 11:
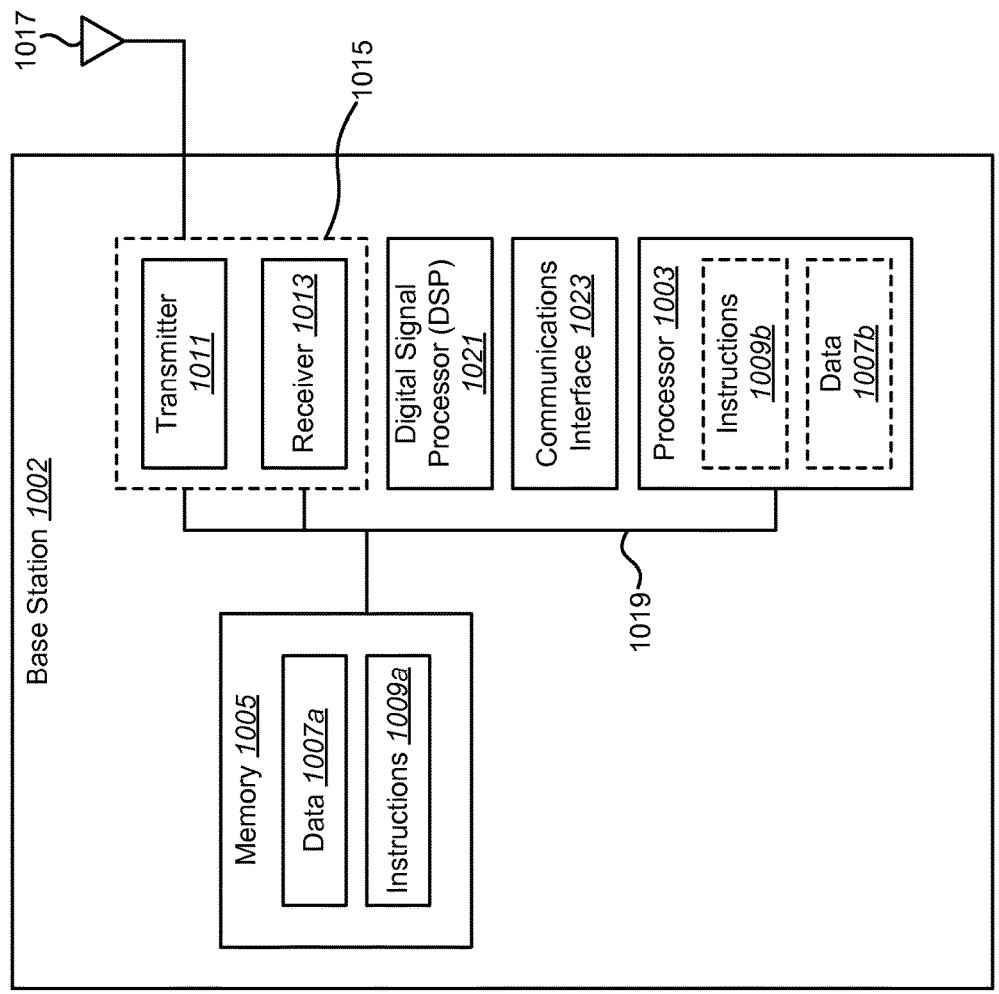
FIG. 11 illustrates certain components that may be included within a base station.

FIG. 11 illustrates certain components that may be included within a base station 1002. A base station may also be referred to as, and may include some or all of the functionality of, an access point, a broadcast transmitter, a NodeB, an evolved NodeB, etc. The base station 1002 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1002 of FIG. 11, in an alternative configuration, a combination of processors (e.g., an ARM and DSP) could be used.

The base station 1002 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007*a* and instructions 1009*a* may be stored in the memory 1005. The instructions 1009*a* may be executable by the processor 1003 to implement the methods disclosed herein. Executing the instructions 1009*a* may involve the use of the data 1007*a* that is stored in the memory 1005. When the processor 1003 executes the instructions 1009*a*, various portions of the instructions 1009*b* may be loaded onto the processor 1003, and various pieces of data 1007*b* may be loaded onto the processor 1003.

The base station 1002 may also include a transmitter 1011 and a receiver 1013 to allow transmission and reception of signals to and from the base station 1002. The transmitter 1011 and receiver 1013 may be collectively referred to as a transceiver 1015. An antenna 1017 may be electrically coupled to the transceiver 1015. The base station 1002 may also include (not shown) multiple transmitters, multiple receivers, multiple transceivers and/or multiple antennas.

The base station 1002 may include a digital signal processor (DSP) 1021. The base station 1002 may also include a communications interface 1023. The communications interface 1023 may allow a user to interact with the base station 1002.

The various components of the base station 1002 may be coupled together by one or more buses, which may include a power bus, a control signal bus, a status signal bus, a data bus, etc. For the sake of clarity, the various buses are illustrated in FIG. 11 as a bus system 1019.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A transceiver for receiving multiple desired signals, comprising:
   a first downconverter that receives a first received signal;
   a second downconverter that receives the first received signal; and
   a first adder that receives an output of the first downconverter and a second received signal, wherein the first received signal is received in a first band by an antenna, wherein the second received signal is received in a second band by the antenna and is separate from an output of the first and second downconverters, wherein the second received signal is provided to the first adder in the second band over a signal path disposed between the antenna and the first adder, wherein there is no downconverter in the signal path between the antenna and the first adder, wherein the first adder outputs a combined analog signal that comprises a first desired signal and a second desired signal, wherein the second desired signal is in a frequency band higher than a bandwidth of the first desired signal in the combined analog signal, and wherein the second desired signal does not overlap the first desired signal in a frequency domain of the combined analog signal.

2. The transceiver of claim 1, wherein the first received signal is coupled from the antenna to the first downconverter and the second downconverter.

3. The transceiver of claim 1, wherein the first desired signal is in the first band and the second desired signal is in the second band.

4. The transceiver of claim 3, wherein the second desired signal is above an alias of a sampling frequency.

5. The transceiver of claim 1, wherein a single analog-to-digital converter is used to convert the combined analog signal to a digital signal.

6. The transceiver of claim 5, wherein the single analog-to-digital converter is on a modem, and wherein a single transceiver-modem coupling is between the first adder and the single analog-to-digital converter.

7. The transceiver of claim 1, wherein the first downconverter and the second downconverter are phase shifted from each other.

8. The transceiver of claim 1, further comprising:
   a first low pass filter coupled between the output of the first downconverter and the input of the first adder;

a second low pass filter coupled between an output of the second downconverter and an input of an analog-to-digital converter; and a bandpass filter that receives the second received signal and is coupled to the input of the first adder.

9. The transceiver of claim 8, further comprising:

a first low noise amplifier that receives the first received signal and is coupled to the input of the first downconverter and the second downconverter; and a second low noise amplifier that receives the second received signal and is coupled to the input of the bandpass filter.

10. The transceiver of claim 1, further comprising a second adder that receives an output of the second downconverter and a third received signal.

11. The transceiver of claim 10, wherein the first desired signal is in the first band, the second desired signal is in the second band and a third desired signal is in a third band.

12. The transceiver of claim 10, wherein the second adder outputs a combined analog signal that comprises the first desired signal and a third desired signal.

13. The transceiver of claim 12, wherein the combined analog signal in sample domain is at a baseband frequency, wherein the third desired signal is adjacent to the first desired signal in the combined analog signal, and wherein the third desired signal does not overlap the first desired signal in the sample domain of the combined analog signal.

14. The transceiver of claim 10, further comprising:

a low noise amplifier that receives the third received signal; and a bandpass filter that receives an output of the low noise amplifier, wherein an output of the bandpass filter is coupled to the second adder.

15. The transceiver of claim 14, further comprising a third downconverter coupled between the output of the low noise amplifier and an input of the bandpass filter, wherein the third downconverter converts the frequency of the third received signal to a frequency above baseband.

16. A method for receiving multiple desired signals, comprising:

downconverting a first received signal to a baseband frequency using a first downconverter;

downconverting the first received signal to a baseband frequency using a second downconverter;

combining an output of the first downconverter with a second received signal to obtain a first combined analog signal comprising a first desired signal and a second desired signal, wherein the first received signal is received in a first band by an antenna, wherein the second received signal is received in a second band by the antenna and is separate from an output of the first and second downconverters, wherein the second received signal is not downconverted prior to being combined with the output of the first downconverter, wherein the second desired signal is in a frequency band higher than a bandwidth of the first desired signal in the first combined analog signal, and wherein the second desired signal does not overlap the first desired signal in a frequency domain of the first combined analog signal; and converting the first combined analog signal to a digital signal using a first analog-to-digital converter.

17. The method of claim 16, wherein the first desired signal is in the first band and the second desired signal is in the second band.

18. The method of claim 17, wherein the second desired signal is above an alias of a sampling frequency.

19. The method of claim 16, wherein the output of the first downconverter and the second received signal are combined using a first adder.

20. The method of claim 19, wherein a single analog-to-digital converter is used to convert the first combined analog signal to a digital signal, wherein the single analog-to-digital converter is on a modem, and wherein a single transceiver-modem coupling is used to provide the first combined analog signal from a transceiver to the single analog-to-digital converter.

21. The method of claim 19, wherein a first low pass filter is coupled between the output of the first downconverter and the input of the first adder, and wherein a second low pass filter is coupled between the output of the second downconverter and a second analog-to-digital converter.

22. The method of claim 21, wherein a first low noise amplifier receives the first received signal and is coupled to the input of the first downconverter and the second downconverter, and wherein a second low noise amplifier receives the second received signal and is coupled to the input of a bandpass filter.

23. The method of claim 16, wherein the first downconverter and the second downconverter are phase shifted from each other.

24. The method of claim 16, further comprising:

combining an output of the second downconverter with a third received signal to obtain a second combined analog signal; and converting the second combined analog signal to a digital signal using a second analog-to-digital converter.

25. The method of claim 24, wherein the first desired signal is in the first band, the second desired signal is in the second band and a third desired signal is in a third band.

26. The method of claim 24, wherein an output of the second downconverter and the third received signal are combined using a second adder, and wherein the second combined analog signal comprises a first desired signal and a third desired signal.

27. The method of claim 26, wherein the second combined analog signal in sample domain is at a baseband frequency, wherein the third desired signal is adjacent to the first desired signal in the second combined analog signal, and wherein the third desired signal does not overlap the first desired signal in the sample domain of the second combined analog signal.

28. The method of claim 26, wherein a first low pass filter is coupled between the output of the first downconverter and the input of the first adder, and wherein a second low pass filter is coupled between the output of the second downconverter and the second adder.

29. The method of claim 26, wherein the third received signal is passed through a low noise amplifier and a bandpass filter before being combined with the output of the second downconverter using the second adder.

30. The method of claim 29, wherein a third downconverter is coupled between the output of the low noise amplifier and an input of the bandpass filter, wherein the third downconverter converts the frequency of the third received signal to a frequency above baseband.

31. An apparatus for receiving multiple desired signals comprising:

means for downconverting a first received signal to a baseband;

means for downconverting the first received signal to a baseband frequency;

means for combining an output of the first downconverter with a second received signal to obtain a first combined analog signal comprising a first desired signal and a second desired signal, wherein the first received signal is received in a first band by an antenna, wherein the second received signal is received in a second band by the antenna, wherein the second received signal is coupled from the antenna to the means for combining via a first path, wherein the first path does not include a downconverter, wherein the second desired signal is in a frequency band higher than a bandwidth of the first desired signal in the first combined analog signal, and wherein the second desired signal does not overlap the first desired signal in a frequency domain of the first combined analog signal; and means for converting the first combined analog signal to a digital signal.

32. The apparatus of claim 31, wherein the first desired signal is in the first band and the second desired signal is in the second band.

33. The apparatus of claim 32, wherein the second desired signal is above an alias of a sampling frequency.

34. The apparatus of claim 31, wherein the output of the first downconverter and the second received signal are combined using a first adder.

\* \* \* \* \*